US009705580B2

(12) United States Patent
Sung et al.

(10) Patent No.: US 9,705,580 B2
(45) Date of Patent: Jul. 11, 2017

(54) WIRELESS COMMUNICATION DEVICE CONTROL OVER WIRELESS NETWORK ANTENNA CONFIGURATIONS

(71) Applicant: Sprint Communications Company L.P., Overland Park, KS (US)

(72) Inventors: Sanghoon Sung, Ashburn, VA (US); Udit A. Thakore, Fairfax, VA (US)

(73) Assignee: Sprint Communications Company L.P., Overland Park, KS (US)

(*) Notice: Subject to any disclaimer, the term of this patent is extended or adjusted under 35 U.S.C. 154(b) by 243 days.

(21) Appl. No.: 14/712,063

(22) Filed: May 14, 2015

(65) Prior Publication Data

US 2016/0337021 A1 Nov. 17, 2016

(51) Int. Cl.
*H04B 7/06* (2006.01)
*H04W 16/28* (2009.01)
*H04W 24/04* (2009.01)

(52) U.S. Cl.
CPC ......... *H04B 7/0617* (2013.01); *H04B 7/0632* (2013.01); *H04W 16/28* (2013.01); *H04W 24/04* (2013.01)

(58) Field of Classification Search
None
See application file for complete search history.

(56) References Cited

U.S. PATENT DOCUMENTS

| 7,933,340 | B2 | 4/2011 | Itoh |
| 8,243,835 | B2 | 8/2012 | Sun et al. |
| 8,798,633 | B2 | 8/2014 | Sergeyev et al. |
| 8,860,334 | B2 | 10/2014 | Zhao |
| 2009/0232240 | A1 | 9/2009 | Lakkis |
| 2010/0177725 | A1* | 7/2010 | van Rensburg ..... H04W 72/046 370/329 |
| 2011/0243079 | A1 | 10/2011 | Chen et al. |
| 2011/0280188 | A1 | 11/2011 | Jeon et al. |
| 2012/0014367 | A1 | 1/2012 | Caillerie et al. |
| 2013/0250879 | A1 | 9/2013 | Ng et al. |
| 2013/0286960 | A1 | 10/2013 | Li et al. |
| 2013/0315192 | A1 | 11/2013 | Seo |

(Continued)

FOREIGN PATENT DOCUMENTS

WO 2014111488 7/2014

*Primary Examiner* — Kevin C Harper
*Assistant Examiner* — Derrick V Rose

(57) ABSTRACT

A wireless communication device receives wireless communications comprising omnidirectional reference signals, beam-formed reference signals, and beam-formed user data. The wireless communication device determines a difference between omnidirectional reference signal quality and beam-formed reference signal quality. The wireless communication device selects an omnidirectional network antenna configuration based on the difference between the omnidirectional reference signal quality and the beam-formed reference signal quality. The wireless communication device transmits wireless signaling indicating the selected omnidirectional network antenna configuration. Responsive to the wireless signaling, the wireless communication device receives additional wireless communications comprising omnidirectional reference signals and omnidirectional user data. In some examples, the network antenna configurations comprise Long Term Evolution (LTE) Transmission Modes (TMs).

20 Claims, 6 Drawing Sheets

(56) References Cited

U.S. PATENT DOCUMENTS

2014/0036664 A1 2/2014 Han et al.
2014/0119266 A1 5/2014 Ng et al.
2014/0226636 A1 8/2014 Xu et al.

* cited by examiner

WIRELESS COMMUNICATION DEVICE CONTROL OVER WIRELESS NETWORK ANTENNA CONFIGURATIONS

TECHNICAL BACKGROUND

Wireless communication devices comprise phones, computers, intelligent machines, or some other apparatus with a wireless transceiver. Wireless communication networks include base stations, distributed antenna systems, or some other type of wireless access point to exchange wireless signals with the wireless communication devices. The wireless communication devices and the wireless communication networks exchange electromagnetic signals over the air to support services like mobile Internet access, audio/video streaming, user data messaging, and the like.

The wireless communication networks use increasingly sophisticated antenna systems. In a simple antenna system, a single antenna in the wireless communication network transmits to a single antenna in the wireless communication device. In another antenna system, four antennas in the wireless communication network transmit to two antennas in the wireless communication device. In yet another antenna system, sixteen antennas in the wireless communication network transmit to four antennas in the wireless communication device.

There are various technologies to allocate the antennas to data streams and wireless communication devices. Using transmission diversity, the same data streams are simultaneously transmitted over separate antennas. Using spatial multiplexing, different data streams are transmitted over different antennas—perhaps to the same wireless communication device.

Multiple Input Multiple Output (MIMO) technologies allocate antennas to data streams and user devices. With Single-User MIMO (SU-MIMO), a single wireless communication device may use one or more network antennas at a given time. With Multiple-User MIMO (MU-MIMO), multiple wireless communication devices may share the same antenna at the same time. MIMO systems transfer multiple data streams (called layers) to the same wireless communication device. Thus, MIMO systems associate combinations of data streams, antennas, and wireless communication devices to perform both transmit diversity and spatial multiplexing.

Beamforming technologies use advanced amplification and phasing to control the direction and shape of the energy field propagating toward the target wireless communication device. The energy field near the wireless communication device is protected and enhanced, while the energy field away from the user device is intentionally destroyed with artificial interference. Effective beamforming typically requires feedback from the wireless communication device, such as its location and received signal quality. The feedback is used to direct the proper amount of energy in the proper direction.

The wireless communication networks and the wireless communication devices use the feedback to control transmit diversity, spatial multiplexing, MIMO, and beamforming. In a common feedback technique, reference signals are inserted into the wireless signals at expected times and frequencies by the wireless communication network. This pattern of time and frequency for the reference signals varies by the type of wireless transmission, and a given time/frequency pattern is referred to as an Antenna Port. The wireless communication device receives and processes the reference signals based on their current Antenna Port to generate their feedback for the wireless communication network. The feedback may indicate a channel quality, MIMO rank, or a precoding matrix indicator.

In Long Term Evolution (LTE) networks, some of the Antenna Ports transmit reference signals in an omnidirectional manner across an entire wireless sector or radio coverage area. Omnidirectional reference signals are often inserted in control signaling portions of the Antenna Port, since the control signaling is often transmitted in an omnidirectional manner. In the LTE networks, other Antenna Ports transmit other reference signals in a beam-formed manner along with beam-formed user data. Thus, the wireless communication device receives both omnidirectional reference signals and beam-formed reference signals.

The allocation of network antennas to a wireless communication device and its data streams is referred to as a network antenna configuration. In LTE, the network antenna configurations are called Transmission Modes (TMs). The network antenna configurations include various parameters for transmit diversity, spatial multiplexing, MIMO, and/or beamforming. The wireless communication networks select their network antenna configurations for individual wireless communication devices based on their device feedback. In LTE, the eNodeB selects the TMs for the wireless communication devices based on their channel quality feedback.

Unfortunately, the wireless communication devices do not effectively process reference signals to control the antenna configurations used by the wireless communication networks. In particular, LTE User Equipment does not process the omnidirectional reference signals and the beam-formed reference signals to direct the eNodeBs to switch from beamforming transmission modes to omnidirectional transmission modes.

TECHNICAL OVERVIEW

A wireless communication device receives wireless communications comprising omnidirectional reference signals, beam-formed reference signals, and beam-formed user data. The wireless communication device determines a difference between omnidirectional reference signal quality and beam-formed reference signal quality. The wireless communication device selects an omnidirectional network antenna configuration based on the difference between the omnidirectional reference signal quality and the beam-formed reference signal quality. The wireless communication device transmits wireless signaling indicating the selected omnidirectional network antenna configuration. Responsive to the wireless signaling, the wireless communication device receives additional wireless communications comprising omnidirectional reference signals and omnidirectional user data. In some examples, the network antenna configurations comprise Long Term Evolution (LTE) Transmission Modes (TMs).

DETAILED DESCRIPTION

Figure 1:
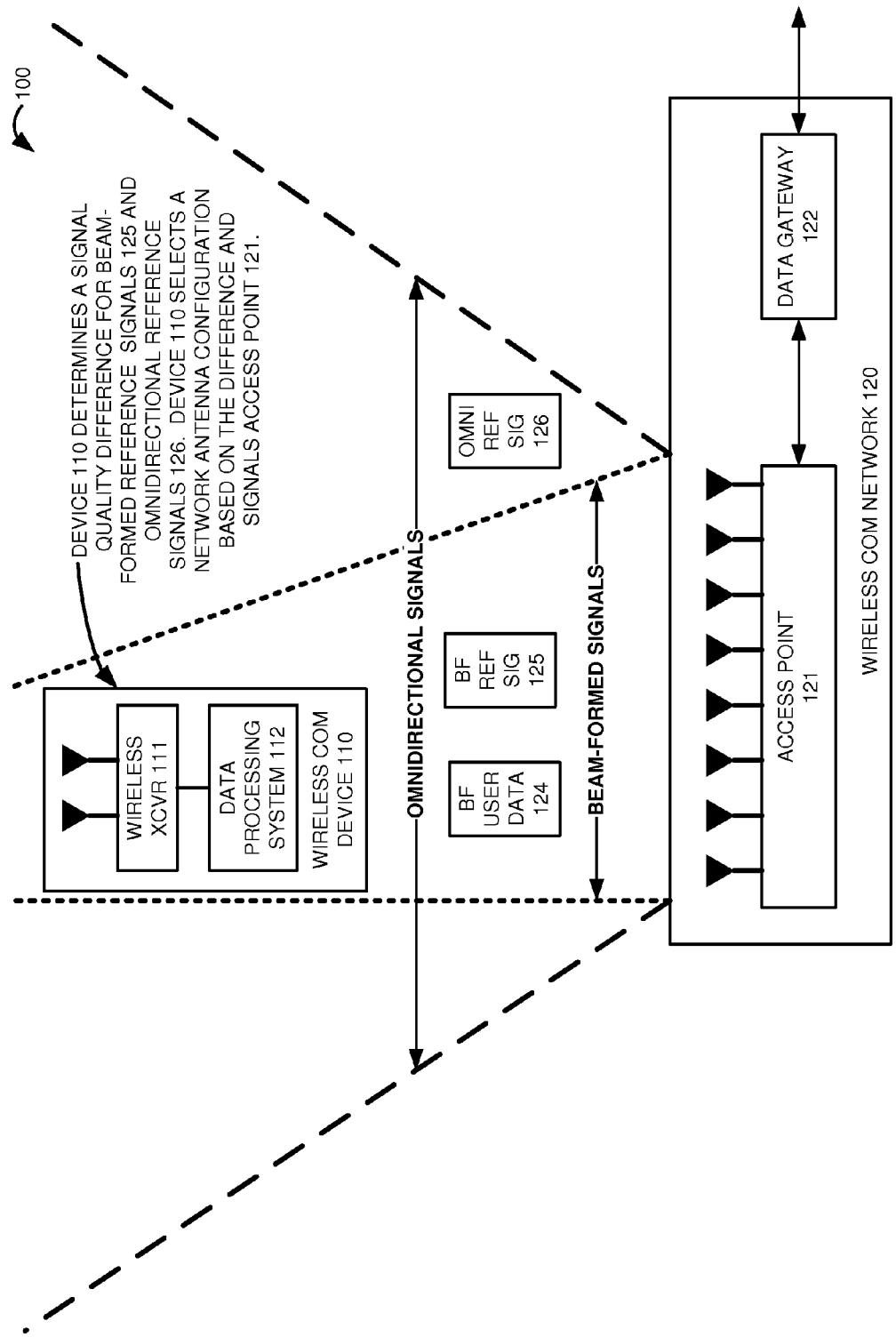
FIGS. 1-2 illustrate a wireless communication system with a wireless communication device that processes wireless reference signals to control network antenna configurations.
Figure 2:
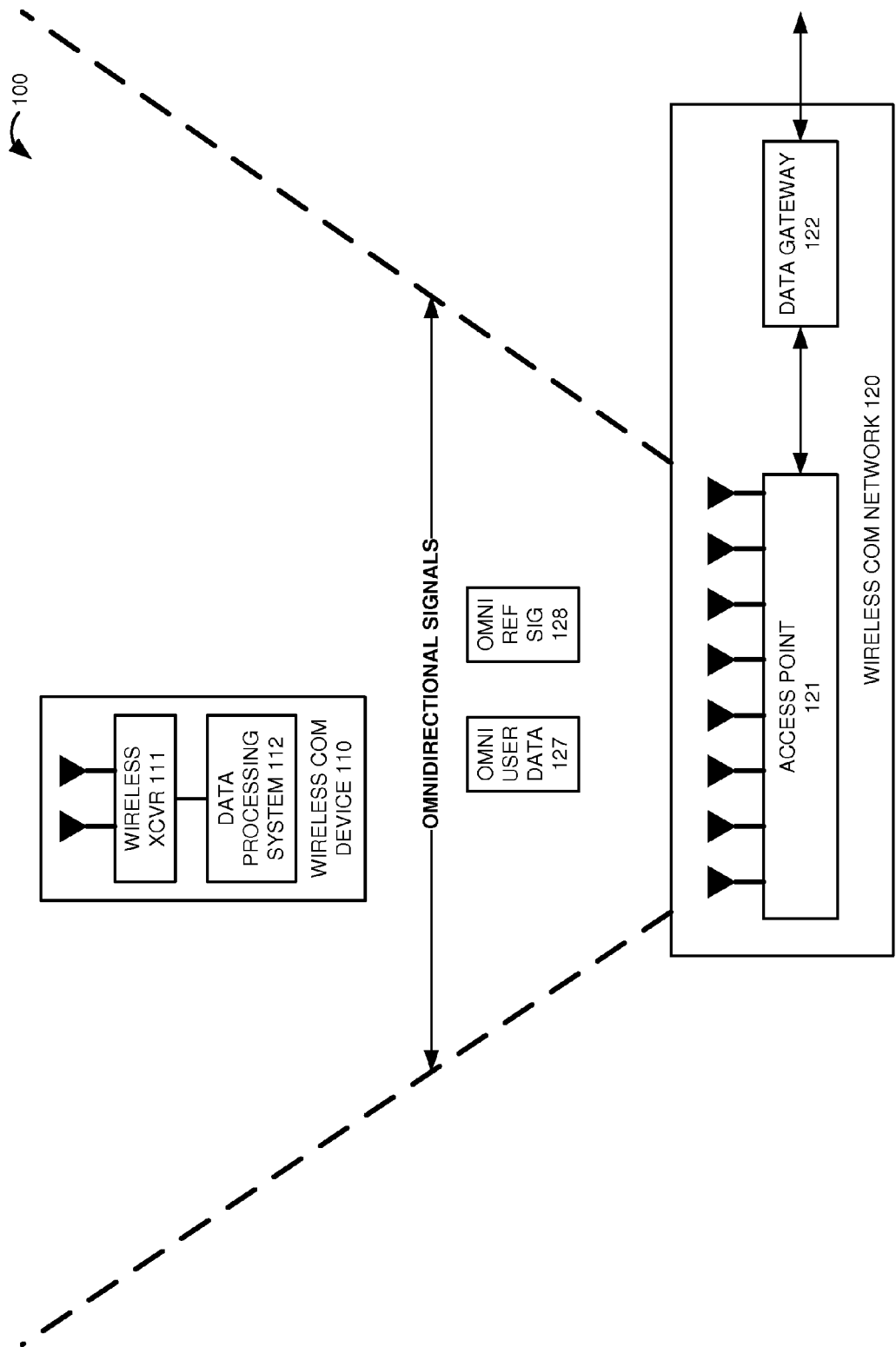

FIGS. 1-2 illustrate wireless communication system 100 with wireless communication device 110 that processes wireless reference signals 125-126 to control network antenna configurations. Communication system 100 comprises wireless communication device 110 and wireless communication network 120. Wireless communication device 110 comprises wireless transceiver 111 and data processing system 112. Wireless communication network 120 comprises wireless access point 121 and data gateway 122.

Wireless transceiver 111 comprises antennas, modulators, processing circuitry, memory devices, software, bus interfaces, and the like. Data processing system 112 comprises processing circuitry, memory devices, software, bus interfaces, and the like. The processing circuitry comprises transistors, registers, and signal paths. The memory devices comprise flash drives, disc drives, read-only circuitry, or some other data storage media. Wireless access point 121 comprises antennas, amplifiers, modulators, signal processing circuitry, memory devices, software, bus interfaces, and the like. Data gateway 122 comprises an Ethernet switch and/or Internet Protocol (IP) router with software components for network address translation and allocation.

Wireless access point 121 transmits omnidirectional communications to all portions of its coverage area, such as a sector, to serve all devices including wireless communication device 110. Wireless access point 121 also transmits beam-formed communications to a smaller portion of its coverage area to serve only wireless communication device 110. The beam-formed communications transport beam-formed user data 124 and beam-formed reference signals 125. The omnidirectional communications transport omnidirectional reference signals 126.

In wireless communication device 110, wireless transceiver system 111 receives the beam-formed wireless communications comprising beam-formed user data 124 and beam-formed reference signals 125. Wireless transceiver system 111 also receives the omnidirectional wireless communications comprising omnidirectional reference signals 126. Data processing system 112 determines a signal quality difference between beam-formed reference signals 125 and omnidirectional reference signals 126. In some examples, this entails the calculation of signal-to-interference and noise ratios for reference signals 125-126.

Data processing system 112 selects an omnidirectional network antenna configuration based on the signal quality difference between beam-formed reference signals 125 and omnidirectional reference signals 126. Wireless transceiver 111 transmits wireless signaling to wireless access point 121 indicating the selected omnidirectional network antenna configuration and possibly the signal quality difference. In wireless communication network 120, access point 121 processes the wireless signaling to implement the selected network antenna configuration.

Referring to FIG. 2, wireless access point 121 now transmits omnidirectional wireless communications that transport omnidirectional user data 127 and omnidirectional reference signals 128. In wireless communication device 110, wireless transceiver 111 now receives the omnidirectional wireless communications comprising omnidirectional user data 127 and omnidirectional reference signals 128. Wireless access point 121 in wireless network 120 no longer transmits beam-formed communications to wireless transceiver 111 in wireless communication device 110. Subsequently, wireless communication device 110 and wireless network 120 may again use beamforming. For example, wireless communication device 110 may request a beam-forming network antenna configuration based on heavy application demand and excellent channel quality metrics.

Figure 3:
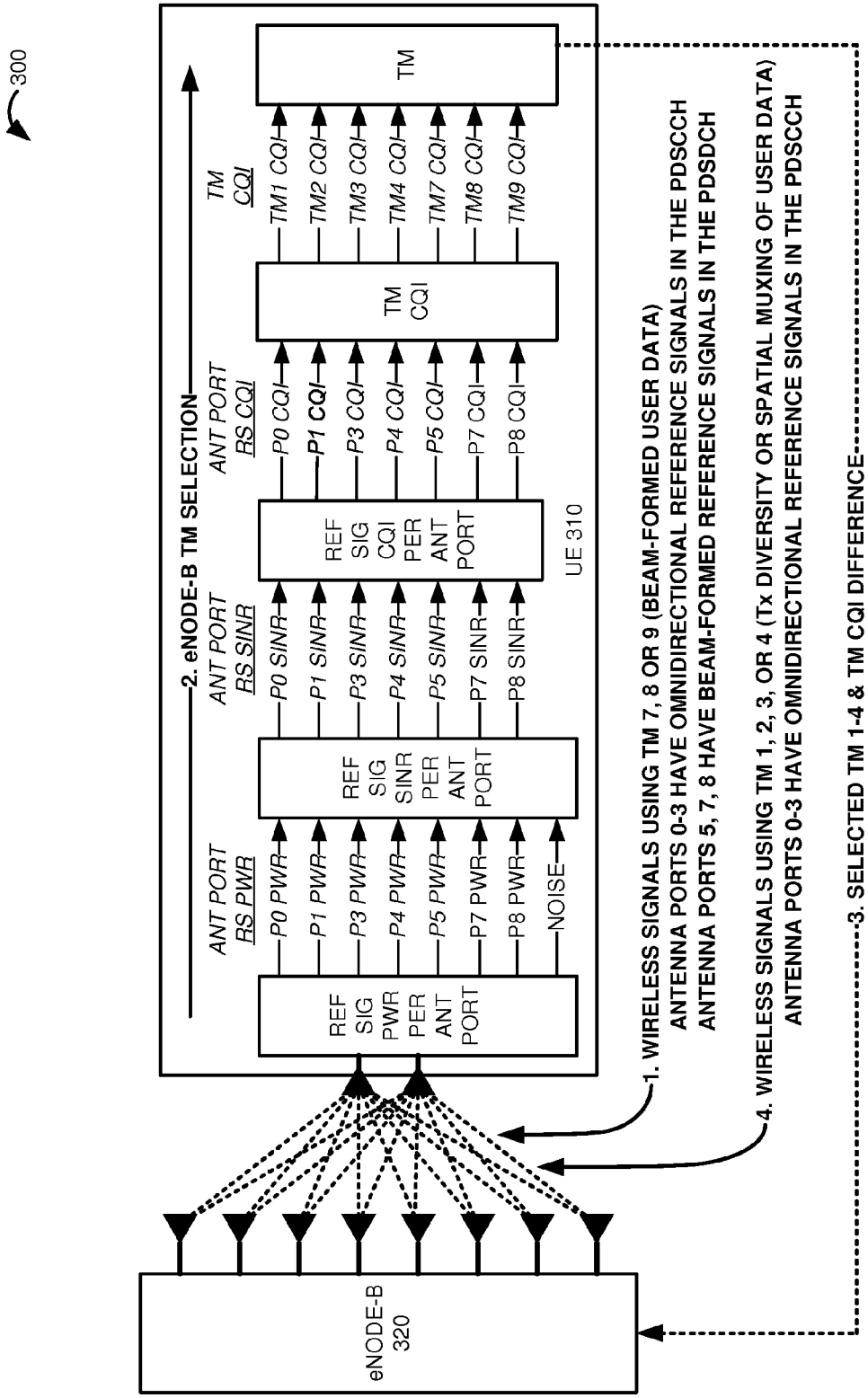
FIGS. 3-4 illustrate a Long Term Evolution (LTE) communication system with User Equipment (UE) that processes reference signals by Antenna Port to control LTE eNodeB Transmission Modes (TMs).
Figure 4:
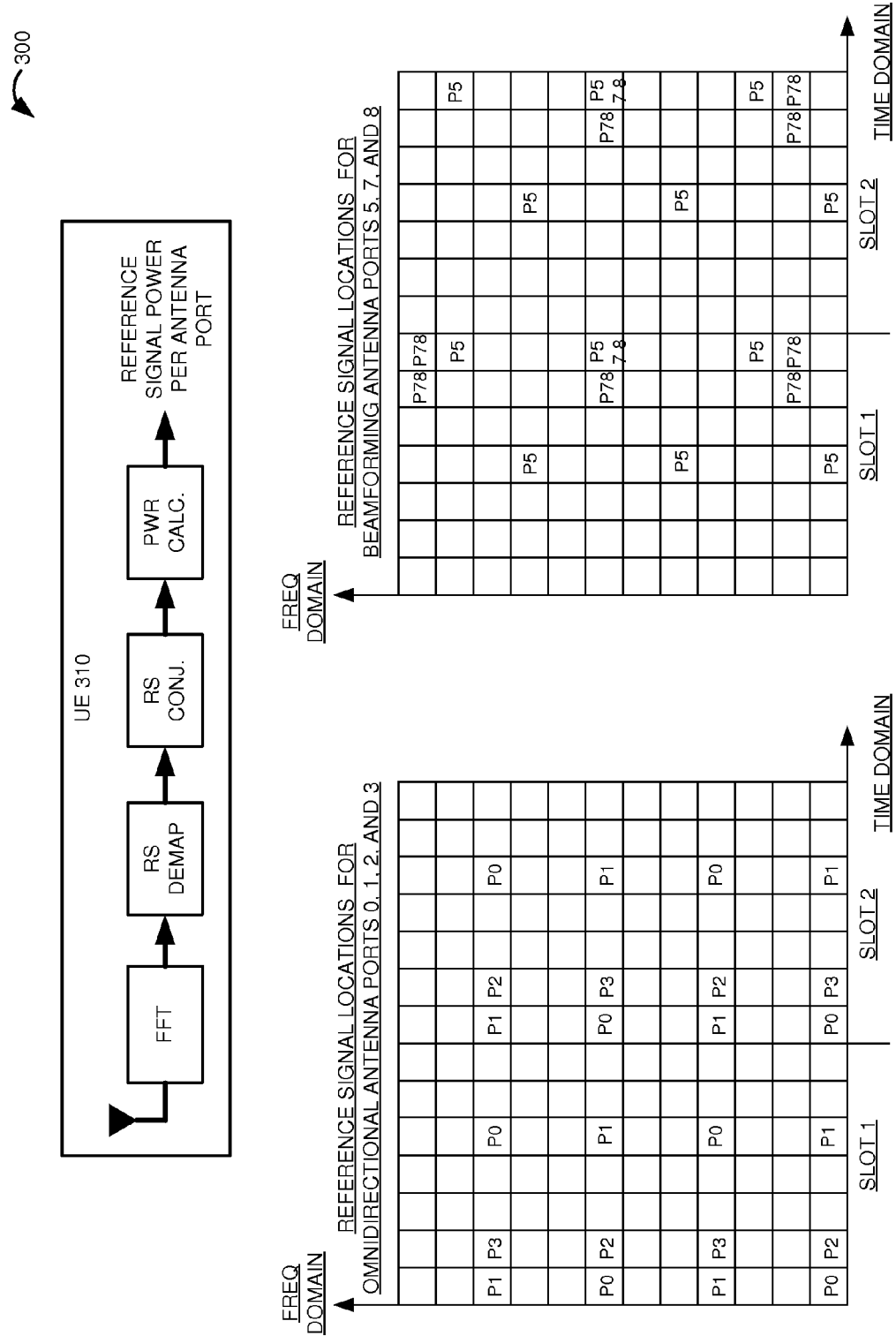

FIGS. 3-4 illustrate Long Term Evolution (LTE) communication system 300 with User Equipment (UE) 310 that processes reference signals by antenna port to control LTE eNodeB Transmission Modes (TMs). LTE system 300 is an example of communication system 100, although system 100 may be configured and operate in a different manner than system 300. UE 310 comprises a phone, computer, intelligent machine, or some other electronic apparatus having an LTE transceiver. eNode-B 320 comprises an LTE base station with an antenna system, baseband unit, router, communication interfaces, LTE protocol software, and power systems.

eNode-B 320 transmits omnidirectional communications and beam-formed communications to UE 310. The omnidirectional communications transport omnidirectional reference signals and omnidirectional user data. The beam-formed communications transport beam-formed reference signals and beam-formed user data. As indicated by point number one on FIG. 3, UE 310 receives wireless signals using one of Transmission Modes (TMs) 7, 8, or 9 that implement beamforming. The beamforming TMs transmit omnidirectional Cell Specific Reference Signals (CS-RS) using antenna ports 0-3 over the Physical Downlink Shared Control Channel (PDSCCH). The beamforming TMs transmit beam-formed De-Modulation Reference Signals (DM-RS) using antenna ports 5, 7, and 8 over the Physical Downlink Shared Data Channel (PDSDCH).

At point number two on FIG. 3, UE 310 processes the CS-RS and the DM-RS to select one of TMs 1-4 or 7-9 for eNode-B 320. Although TMs 1-4 and 7-9 are used in system 300, other combinations of TMs could be used, such as a combination of TMs 4 and 9, or a combination of TMs 1, 2, 7, and 8. TMs 1-4 and 7-9 each use one or more logical antenna ports 0-3, 5, and 7-8. Antenna ports 0-3, 5, and 7-8 each provide a different logical view of the wireless signals arriving at UE 310. Antenna ports 0-3, 5, and 7-8 each use a different Resource Element (RE) pattern in the time/frequency domain for the CS-RS and DM-RS (if any).

UE 310 determines a received power level for the CS-RS and the DM-RS on a per antenna port basis. UE 310 demaps the RS to determine RS power and then aggregates these power levels to the appropriate antenna ports for the current TM. UE 310 determines a Signal-to-Interference and Noise Ratio (SINR) on a per antenna port basis based on the antenna port power levels and the current interference and noise level that affects all ports. UE 310 determines a Channel Quality Index (CQI) on a per antenna port basis based on the antenna port SINRs and empirically-developed SINR-to-CQI scaling factors.

UE 310 determines CQIs on a per TM basis based on the antenna port CQIs as mapped to their corresponding TMs. UE 310 selects one of TMs 1-4 or 7-9 based on the TM CQIs. For example, UE 310 may select between TM 4 and TM 9 based on the best average TM CQI. UE 310 may select between TMs 1-2 and TMs 7-8 based on a set of prioritized TM CQI thresholds. In this example, UE 310 selects one of TMs 1-4 over its current one of TMs 7-9.

At point number three on FIG. 3, UE 310 transmits wireless signaling to eNode-B 320 indicating the selected TM 0-4 and the TM CQI difference. Typically, the selected TM and CQI difference are indicated along with the current report having the CQI, Precoding Matrix Indicator (PMI), and Rank Index (RI).

At point number four on FIG. 3, UE 310 now receives wireless signals using one of TMs 1-4 that do not use beamforming. The omnidirectional TMs 1-4 transmit omni-directional CS-RS using antenna ports 0-3 over the PDSCCH. TMs 1-4 do not use beam-formed DM-RS or antenna ports 5, 7, and 8. UE 310 and eNode-B 320 may subsequently revert to beamforming TMs 7-9 based on CQI, time, re-attachment, or some other trigger. For example, beamforming TMs 7-9 may be used again if the CQI for the current one of TMs 1-4 exceeds relatively high threshold. The process would then repeat from point number one.

FIG. 4 further illustrates LTE system 300. In the grid on the left, the reference signal locations for antenna ports 0-3 are shown in the LTE frequency/time domain. Each grid block represents a Resource Element (RE)—one symbol over one subcarrier. The RS for antenna ports 0-3 are omnidirectional CS-RS. In the grid on the right, the reference signal locations for antenna ports 5, 7, and 8 are shown in the LTE frequency/time domain. The RS for antenna ports 5, 7, and 8 are beam-formed DM-RS. The DM-RS for antenna ports 7-8 share REs by using code division. The DM-RS for antenna port 5 do not share REs with antenna ports 7-8 but use the REs instead of antenna ports 7-8.

UE 310 is partially depicted at the top of FIG. 4. In UE 310, the signal energy from the antenna is filtered and converted through a Fast-Fourier Transform (FFT) to expose the frequency domain. UE 310 de-maps the RS from frequency domain based on the current antenna ports. UE 310 applies a reverse conjugate process to the de-mapped RS using a known RS symbol to leave RS power information. UE 310 processes this RS power information to aggregate RS power levels to their proper antenna port. The TM selection process then continues with the SINR process discussed above.

Figure 5:
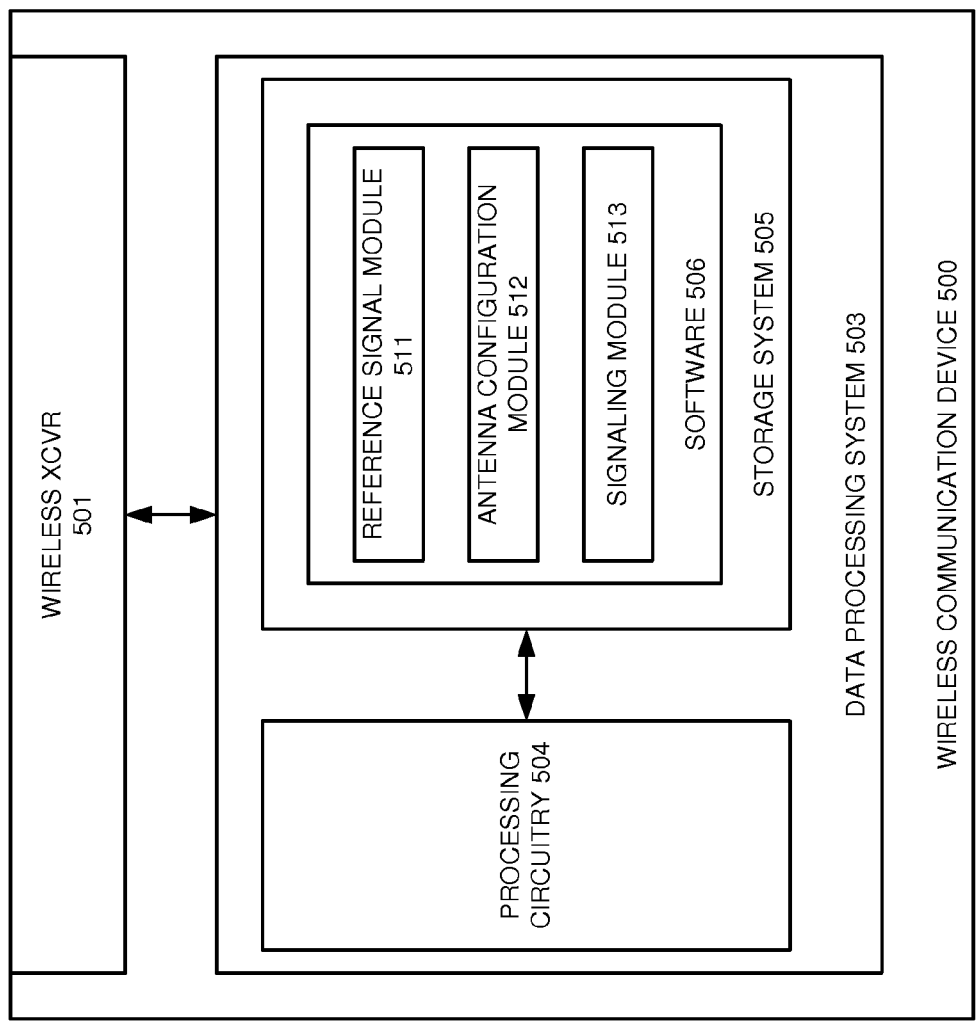
FIG. 5 illustrates a wireless communication device to process reference signals from wireless access points to control network antenna configurations.

FIG. 5 illustrates wireless communication device 500 to process reference signals from wireless access points to control network antenna configurations. Wireless communication device 500 comprises wireless transceiver 501 and data processing system 503. Wireless communication device 500 is an example of wireless communication device 110 and UE 310, although these systems may use alternative configurations and operations. Some conventional aspects of wireless communication device 500 are omitted for clarity, such as user interfaces, power supplies, enclosures, and the like. Wireless communication device 500 may be centralized in a single unit or distributed across multiple components.

Wireless transceivers 501 comprise antennas, amplifiers, filters, circuitry, digital signal processors, memory devices, wireless protocol software, bus interfaces, and the like. Wireless transceiver 501 receives wireless signals having omnidirectional and beam-formed reference signals and user data. Wireless transceiver 501 transmits wireless signaling indicating selected network antenna configurations and related data.

Data processing system 503 comprises processing circuitry 504 and storage system 505. Storage system 505 stores software 506. Software 506 includes software modules 511-513. Processing circuitry 504 comprises circuit boards, bus interfaces and connections, integrated circuitry, and associated electronics. Storage system 505 comprises non-transitory, machine-readable, data storage media, such as flash drives, disc drives, memory circuitry, tape drives, servers, and the like. Software 506 comprises machine-readable instructions that control the operation of processing circuitry 504 when executed. Software 506 includes software modules 511-513 and may also include operating systems, applications, data structures, virtual machines, utilities, databases, and the like. All or portions of software 506 may be externally stored on one or more storage media, such as circuitry, discs, tape, and the like.

When executed by processing circuitry 504, reference signal module 511 directs circuitry 504 to process reference signal metrics to determine the signal qualities of different network antenna configurations. When executed by processing circuitry 504, antenna configuration module 512 directs circuitry 504 to select a target network antenna configuration based on the signal qualities of the different network antenna configurations. When executed by processing circuitry 504, signaling module 513 directs circuitry 504 to generate wireless signaling indicating selected network antenna configurations and related signal quality data.

Figure 6:
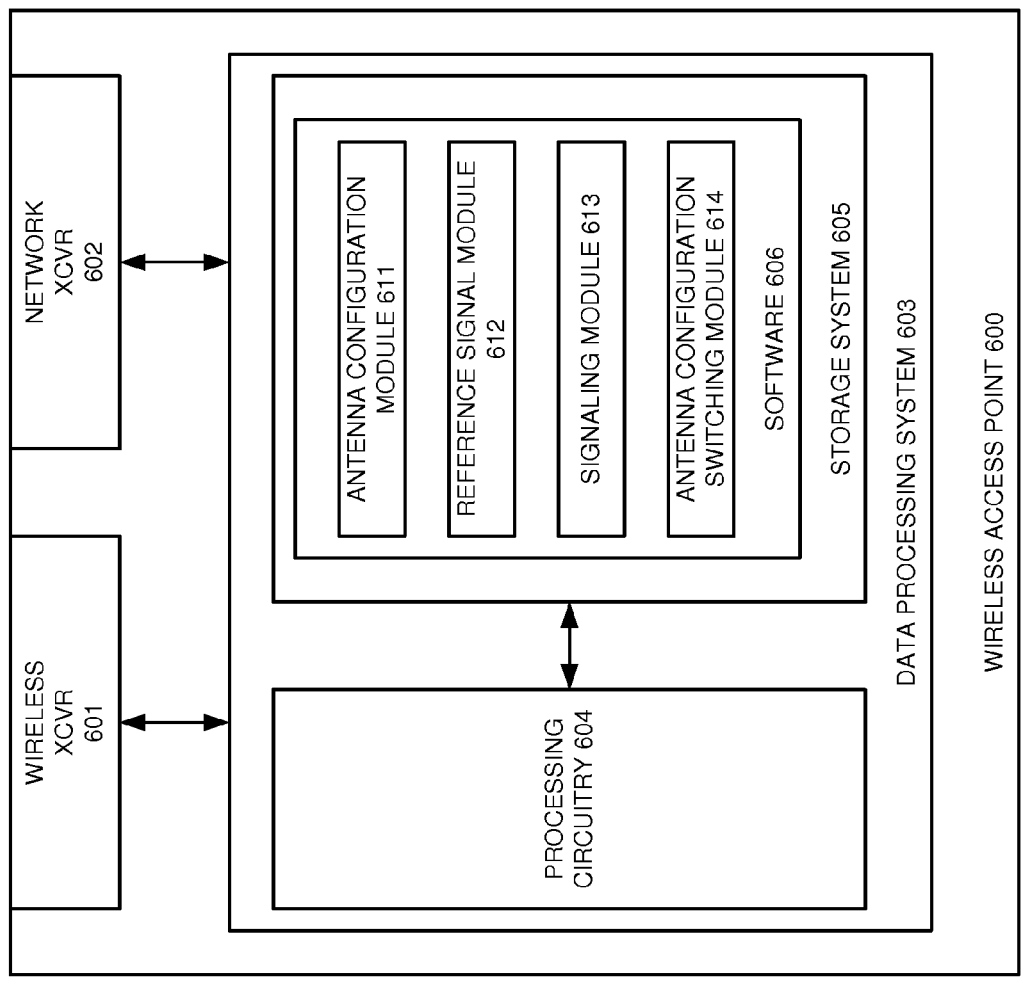
FIG. 6 illustrates a wireless access point that allows wireless communication devices to control its network antenna configurations.

FIG. 6 illustrates wireless access point 600 that allows wireless communication devices to control its network antenna configurations. Wireless access point 600 comprises wireless transceiver 601, network transceiver 602, and data processing system 603. Wireless access point 600 is an example of wireless communication network 120 and eNode-B 320, although these systems may use alternative configurations and operations. Some conventional aspects of wireless access point 600 are omitted for clarity, such as power supplies, enclosures, and the like. Wireless access point 600 may be centralized in a single unit or distributed across multiple components.

Wireless transceiver 601 comprises antennas, amplifiers, filters, circuitry, digital signal processors, memory devices, wireless protocol software, bus interfaces, and the like. Network transceiver 602 comprises layer two ports, circuitry, processing circuitry, memory devices, networking software, bus interfaces, and the like. Wireless transceiver 601 transmits wireless signals having omnidirectional and beam-formed reference signals and user data. Wireless transceiver 601 receives wireless signaling indicating selected network antenna configurations and related data. Network transceiver 602 exchanges user data and related control information with network gateways and other systems.

Data processing system 603 comprises processing circuitry 604 and storage system 605. Storage system 605 stores software 606. Software 606 includes software modules 611-614. Processing circuitry 604 comprises server blades, backplanes, bus interfaces, integrated circuitry, and associated electronics. Storage system 605 comprises non-transitory, machine-readable, data storage media, such as flash drives, disc drives, memory circuitry, tape drives, servers, and the like. Software 606 comprises machine-readable instructions that control the operation of processing circuitry 604 when executed. Software 606 includes software modules 611-614 and may also include operating systems, applications, data structures, virtual machines, utilities, databases, and the like. All or portions of software 606 may be externally stored on one or more storage media, such as circuitry, discs, tape, and the like.

When executed by processing circuitry 604, antenna configuration module 611 directs circuitry 604 to generate control data that drives wireless transceiver 601 to use a given antenna configuration, such as beamforming configurations and omnidirectional configurations. When executed by processing circuitry 604, reference signal module 612 directs circuitry 604 to generate and insert reference signals into the appropriate time/frequency positions of the wireless signals for the current antenna configuration. When executed by processing circuitry 604, signaling module 613 directs circuitry 604 to process signaling to detect selected antenna configurations and other related signal quality data. When executed by processing circuitry 604, antenna configuration switching module 614 directs circuitry 604 to process the selected antenna configurations and other related signal quality data to determine when to switch to a new antenna configuration and to drive to wireless transceiver 601 to use the selected antenna configuration for the associated wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to control beamforming, the method comprising:
   receiving first wireless communications comprising omnidirectional reference signals, beam-formed reference signals, and beam-formed user data;
   determining a difference between omnidirectional reference signal quality and beam-formed reference signal quality;
   selecting an omnidirectional network antenna configuration based on the difference between the omnidirectional reference signal quality and the beam-formed reference signal quality and transmitting wireless signaling indicating the selected omnidirectional network antenna configuration; and
   responsive to the wireless signaling, receiving second wireless communications comprising omnidirectional reference signals and omnidirectional user data.

2. The method of claim 1 wherein:
   receiving the beam-formed reference signals comprises receiving Long Term Evolution (LTE) Transmission Mode 9 (TM9) reference signals; and
   receiving the beam-formed user data comprises receiving LTE TM9 user data.

3. The method of claim 1 wherein:
   receiving the beam-formed reference signals comprises receiving Long Term Evolution (LTE) Transmission Mode 8 (TM8) reference signals; and
   receiving the beam-formed user data comprises receiving LTE TM8 user data.

4. The method of claim 1 wherein:
   receiving the beam-formed reference signals comprises receiving Long Term Evolution (LTE) Transmission Mode 7 (TM7) reference signals; and
   receiving the beam-formed user data comprises receiving LTE TM7 user data.

5. The method of claim 1 wherein receiving the beam-formed reference signals comprises receiving Long Term Evolution (LTE) reference signals over at least one of LTE Antenna Ports 5, 7, and 8.

6. The method of claim 1 wherein receiving the first wireless communications comprising the omnidirectional reference signals comprises receiving Long Term Evolution (LTE) reference signals from at least one of LTE Antenna Ports 0, 1, 2, and 3.

7. The method of claim 1 wherein:
   selecting the omnidirectional network antenna configuration comprises selecting Long Term Evolution (LTE) Transmission Mode 4 (TM4);
   transmitting the wireless signaling indicating the selected omnidirectional network antenna configuration comprises transmitting the wireless signaling indicating the LTE TM4;
   receiving the second wireless communications comprising the omnidirectional user data and the omnidirectional reference signals comprises receiving LTE TM4 user data and LTE TM4 reference signals.

8. The method of claim 1 wherein:
   selecting the omnidirectional network antenna configuration comprises selecting Long Term Evolution (LTE) Transmission Mode 3 (TM3);
   transmitting the wireless signaling indicating the selected omnidirectional network antenna configuration comprises transmitting the wireless signaling indicating the LTE TM3;
   receiving the second wireless communications comprising the omnidirectional user data and the omnidirectional reference signals comprises receiving LTE TM3 user data and LTE TM3 reference signals.

9. The method of claim 1 wherein determining the difference between omnidirectional reference signal quality and the beam-formed reference signal quality comprises:
   determining an omnidirectional reference signal signal-to-interference and noise ratio;
   determining a beam-formed reference signal signal-to-interference and noise ratio.

10. The method of claim 1 wherein determining the difference between the omnidirectional reference signal quality and the beam-formed reference signal quality comprises determining a difference between a Long Term Evolution (LTE) omnidirectional reference signal Channel Quality Index (CQI) and an LTE beam-formed reference signal CQI.

11. A wireless communication device to control beamforming comprising:
   a wireless transceiver system configured to receive first wireless communications comprising omnidirectional reference signals, beam-formed reference signals, and beam-formed user data;
   a data processing system configured to determine a difference between omnidirectional reference signal quality and beam-formed reference signal quality;
   the data processing system configured to select an omnidirectional network antenna configuration based on the difference between the omnidirectional reference signal quality and the beam-formed reference signal quality; and
   the wireless transceiver system configured to transmit wireless signaling indicating the selected omnidirectional network antenna configuration and responsively receive second wireless communications comprising omnidirectional reference signals and omnidirectional user data.

12. The wireless communication device of claim 11 wherein the wireless transceiver system is configured to receive Long Term Evolution (LTE) Transmission Mode 9 (TM9) reference signals LTE TM9 user data.

13. The wireless communication device of claim 11 wherein the wireless transceiver system is configured to receive Long Term Evolution (LTE) Transmission Mode 8 (TM8) reference signals LTE TM8 user data.

14. The wireless communication device of claim 11 wherein the wireless transceiver system is configured to receive Long Term Evolution (LTE) Transmission Mode 7 (TM7) reference signals LTE TM7 user data.

15. The wireless communication device of claim 11 wherein the wireless transceiver system is configured to receive Long Term Evolution (LTE) reference signals over at least one of LTE Antenna Ports 5, 7, and 8.

16. The wireless communication device of claim 11 wherein the wireless transceiver system is configured to receive Long Term Evolution (LTE) reference signals over at least one of LTE Antenna Ports 0, 1, 2, and 3.

17. The wireless communication device of claim 11 wherein:
the data processing system is configured to select Long Term Evolution (LTE) Transmission Mode 4 (TM4) as the network antenna configuration;
the wireless transceiver system is configured to transmit the wireless signaling indicating the LTE TM4 and receive LTE TM4 user data and LTE TM4 reference signals.

18. The wireless communication device of claim 11 wherein:
the data processing system is configured to select Long Term Evolution (LTE) Transmission Mode 3 (TM3) as the network antenna configuration;
the wireless transceiver system is configured to transmit the wireless signaling indicating the LTE TM3 and receive LTE TM3 user data and LTE TM3 reference signals.

19. The wireless communication device of claim 11 wherein the data processing system is configured to determine an omnidirectional reference signal signal-to-interference and noise ratio and a beam-formed reference signal signal-to-interference and noise ratio.

20. The wireless communication device of claim 11 wherein the data processing system is configured to determine a difference between a Long Term Evolution (LTE) omnidirectional reference signal Channel Quality Index (CQI) and an LTE beam-formed reference signal CQI.

* * * * *